July 24, 1934.  C. P. POTTER  1,967,684

ELECTRICAL APPARATUS

Filed March 16, 1932

Inventor
C. P. POTTER
By E. E. Shuffman
Att'y.

Patented July 24, 1934

1,967,684

UNITED STATES PATENT OFFICE 1,967,684

ELECTRICAL APPARATUS

Charles P. Potter, St. Louis, Mo., assignor to Wagner Electric Corporation, St. Louis, Mo., a corporation of Delaware Application March 16, 1932, Serial No. 599,092

5 Claims. (Cl. 172—36)

My invention relates to electrical apparatus and particularly to means for anchoring the conductors leading into the interior of the casing of a totally enclosed dynamo electric machine and forming a gas-tight joint between the conductors and the casing. In such machines it is important that the joint between the casing and the conductors be not only sealed against the interchange of air between the interior and the exterior of the apparatus, and against electrical arcs passing to the exterior, but also that the joint be sufficiently strong to withstand pressure resulting from gases exploding in the interior of the machine.

One of the objects of my invention is to produce a joint having these characteristics, and a further object is to so seal the "lead in" conductors in the casing that the insulation thereof will not be injured by vibration of the casing or by mechanical strains. Still another object of my invention is to form a mechanically strong joint between the "lead in" conductors and the wall of the casing that will not extend beyond the outlines of the casing and, therefore, be free from injury from external sources.

Figure 1:
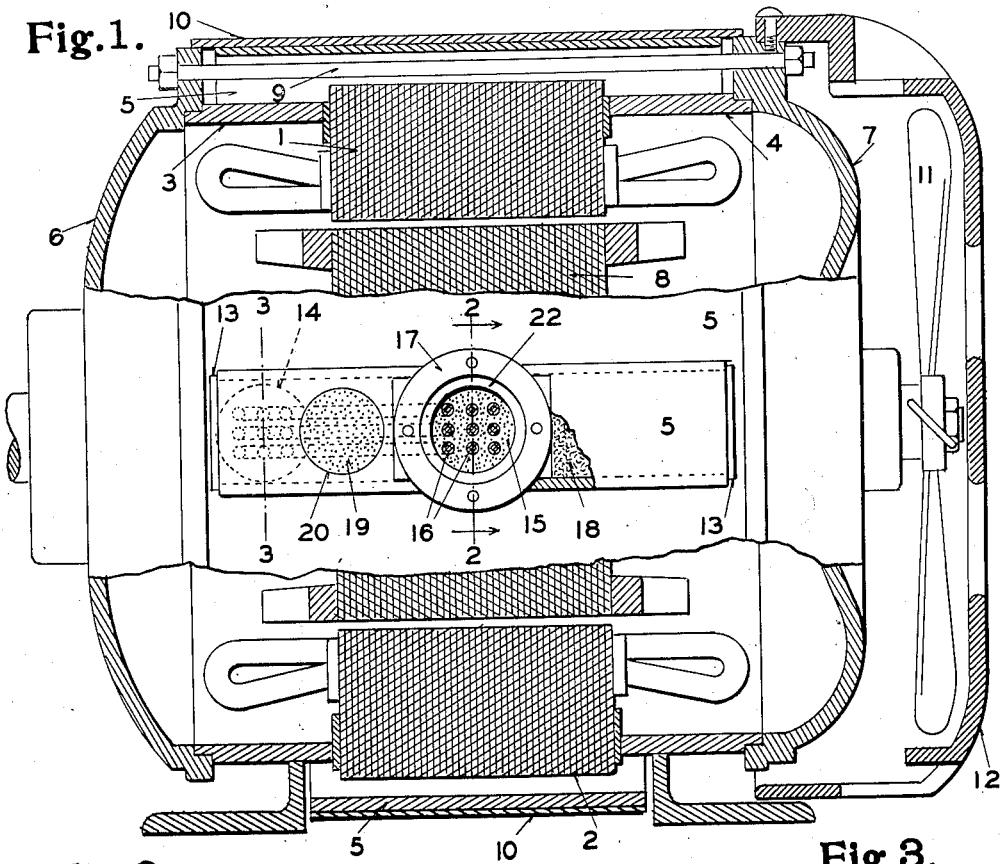
Figure 2:
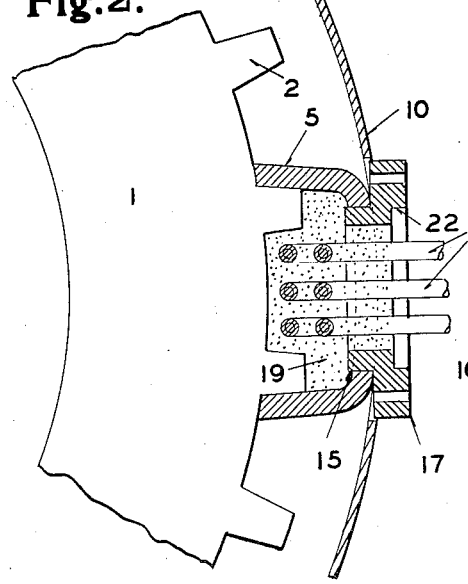
Figure 4:
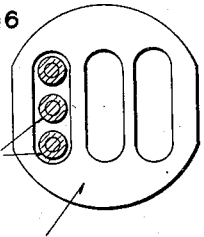
Figure 3:
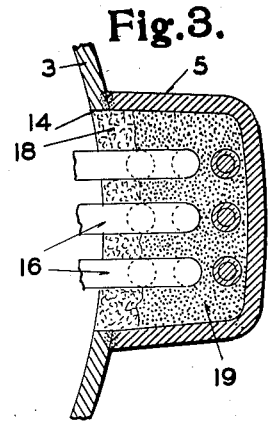

Other objects will become apparent from the following description taken in connection with the accompanying drawing, disclosing my invention applied to a dynamo electric machine, in which Figure 1 is a side elevation, partly in section, of a totally enclosed dynamo electric machine embodying my novel joint for the "lead in" conductors; Figure 2 is an enlarged cross sectional view taken on the line 2—2 of Figure 1, the machine cover also being shown; Figure 3 is a cross sectional view taken on the line 3—3 of Figure 1; and Figure 4 is a front view of the terminal or positioning board for the external ends of the conductors.

Referring to the drawing in detail, 1 indicates the field element of a dynamo electric machine built up from a plurality of laminæ provided with circumferential extensions 2 to act as heat radiating elements. The laminæ are held together by end rings 3 and 4 and a plurality of circumferentially spaced apart channel members 5 welded to the end rings. These channel members are of such dimension as to span one of the grooves formed by the heat radiating projections. The end plates 6 and 7, which are provided with bearings for the rotor 8, are clamped to the end rings by means of through bolts 9 positioned in the channel members. A cylindrical cover 10 surrounds the portion of the machine between the end plates. The shaft of the rotor is also provided with a fan 11 for forcing cooling air between the cover 10 and the field laminæ, the fan being covered by a perforated plate 12 attached to the end plate 7.

One of the channel members 5 is shown as containing my novel joint for the conductors leading into the interior of the machine. The channel member selected for this purpose is preferably at the side of the machine and does not contain a through bolt 9. The ends of the channel member are sealed by suitable plates 13, welded to the end of the channel member. An opening 14 in the end ring 3 and an opening 15 in the central portion of the web of the channel member out of alignment with the opening 14, provide a double angle passage way between the exterior and the interior of the machine for the reception of the "lead in" conductors 16. A terminal box support 17 is attached to the walls of the opening 15 to provide a convenient attachment for the terminal box (not shown). Suitable fibrous material 18, such as oakum, closes the opening 14 in the end ring 3 and the portion of the channel member 5 to the right of the opening 15 so that the sealing compound 19, during pouring, will be confined to the portion of the channel member containing the conductors 16. An opening 20 is provided in the web of the channel member for inserting the sealing compound. The terminal box support is provided with a terminal board 21 fitting into a suitable recess 22 in the terminal box support, this board, as shown in Figure 4, being provided with slots for properly positioning the "lead in" conductors.

In assembling the structure, the conductors are first inserted and properly positioned in the passage formed by the channel member and the openings 14 and 15, the oakum then being placed in its proper position to form the chamber for the sealing compound. The external end of the conductors are next inserted through the terminal board which is positioned in the recess 22 of the terminal box support. The sealing compound is now poured into the channel member through the opening 20 until the conductors are completely surrounded and the channel is filled by the compound. If the compound is not able to flow into the portion of the channel member behind the terminal boards, the board may be raised from its seat and sufficient compound poured in to completely fill the vacant space. The terminal box support is now ready for the attachment of the terminal box.

It is to be noted that my novel joint provides for the conductors being surrounded by a seal for a considerable length without having the joint extend beyond the outlines of the machine. Also, since the conductors, in passing through the joint, make two substantially right angle bends and the sealing compound surrounding the conductors is confined by the casing structure of the machine, there is no danger of an internal pressure in the machine blowing out the joint.

Having fully described my invention, what I claim as new and desire to secure by Letters Patent of the United States is:

1. In a dynamo electric machine, a channel member for securing the laminæ of the field element together and cooperating with the laminæ to form a tubular passage, "lead in" conductors in said passage, said conductors entering the channel member at a point opposite the laminæ and entering the machine at a point laterally displaced from said laminæ, and means forming a gas-tight seal in said package.

2. In combination, an electric machine casing provided with a double angle passage placing the interior thereof in communication with the exterior, electrical conductors for said machine extending through said passage, and means for sealing said passage.

3. In a dynamo electric machine, a channel member for securing the laminæ of the field element together and providing a passage for the "lead in" conductors, said passage communicating with the interior and the exterior of the machine at longitudinally spaced apart points, electrical conductors extending through said passage, and means for sealing said conductors in the passage.

4. In combination, an electrical machine, means comprising housing elements for totally enclosing the electrical elements of the machine, said means being provided with a conductor "lead in" passage, the internal opening of said passage being out of alignment with the external opening, electrical conductors extending through said passage, and means for sealing said passage.

5. In combination, an electrical machine casing provided with an elongated chamber, said chamber having an opening communicating with the interior of the casing and a second opening out of alignment with the first opening and communicating with the exterior of the casing, electrical conductors for said machine extending through the chamber and said openings, means for sealing said chamber against passage of gases therethrough, and a terminal box support carried by the walls of the exterior opening and surrounding the conductors.

CHARLES P. POTTER.